O. W. BEAN.
APPARATUS FOR HANDLING HIDES DURING THE TANNING PROCESS.
No. 7,311. Reissued Sept. 19, 1876.
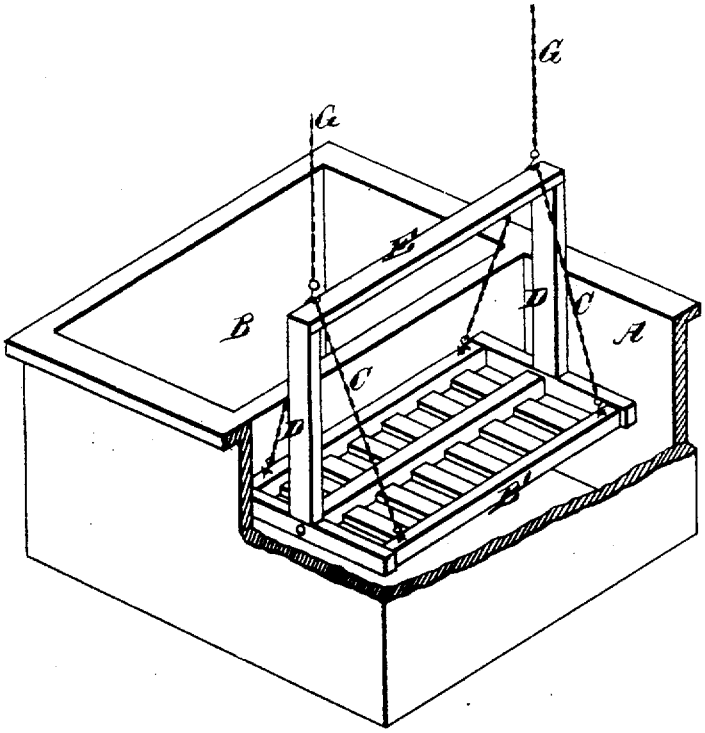
WITNESSES
E. H. Bates
George S. Upham.
INVENTOR.
Otis W. Bean.
Gilmore, Smith & Co.
ATTORNEYS
N. PETERS, PHOTO-LITHOGRAPHER, WASHINGTON, D. C.

UNITED STATES PATENT OFFICE.

OTIS W. BEAN, OF TECUMSEH, MICHIGAN.

IMPROVEMENT IN APPARATUS FOR HANDLING HIDES DURING THE TANNING PROCESS.

Specification forming part of Letters Patent No. 170,330, dated November 23, 1875; reissue No. 7,311, dated September 19, 1876; application filed August 12, 1876.

*To all whom it may concern:*

Be it known that I, OTIS W. BEAN, of Tecumseh, in the county of Lenawee and State of Michigan, have invented certain new and useful Improvements in Vats for Tanning Leather; and I do hereby declare the following to be a full, clear, and exact description thereof, reference being had to the accompanying drawing and to the letters of reference marked thereon.

The nature of my invention consists in the construction and use of a false bottom or horizontal platform, on which the hides to be tanned are laid, adapted to be operated by suitable mechanism for elevating said bottom or platform, and the hides thereon, to the surface of the liquid, or part of the way to said surface, or entirely out of the vat.

The annexed drawing represents a perspective view of two adjoining vats, one of which contains my apparatus, the nearer wall of said vat being partly broken away.

A and B designate two adjoining vats of any ordinary construction. B′ designates a platform, either solid or open, of such size as to pass easily down into vat A, while retaining a horizontal position. From the center of each end of said platform or false bottom B′ rises a post or standard, D, and the upper ends of said posts or standards are connected by a beam, E. C C represent two chains, which are fastened to the platform B′ in the following manner: The middle part of each one of said chains is passed over beam E, near one end thereof, and each end of said chain is secured to one of the sides of platform or false bottom B′, near one of the ends thereof, the two ends of said chain being opposite to one another. Chains G G are hooked or otherwise attached by one end to chains C C, just above beam E, while the other end of each one of said chains passes to a windlass or other suitable elevating device. Every vat is preferably furnished with one of these removable platforms or false bottoms, and with the necessary attachments above described. Standards D D and beam E are not indispensable, though they are useful when it is desired to dump the hides which have just been raised from one vat into another. In this case the chains C C are unfastened from one side of said platform or false bottom B′, and the said beam and standard afford a leverage for tilting said platform.

In practice the hides are thrown into the vat until they fill the same, being intermingled with the tanning-liquor and resting upon the platform or false bottom B′. When said hides have exhausted the strength of said liquor, or as often as is desirable, the windlass is operated, raising the platform B′ and the hides to the top of the tank. The hides are then transferred to another tank, either by dumping or handling, or in any convenient manner. The liquor is then drawn off and replaced by fresh liquor, the false bottom B′ is lowered to the bottom of the vat again, and all is in readiness for a fresh supply of hides.

My invention is essentially different from a movable rack from which the hides are to be hung. In this latter case, partly owing to their being kept in one position, and partly owing to the stretching effect of their own weight, the hides make a comparatively thin and unsatisfactory article of leather; while if thrown loosely into the liquor, they will be fulled and rumpled, and thoroughly saturated, becoming thicker and better leather.

My invention unites the utmost convenience of removal with the most advantageous method of tanning.

If desired, the platform B′, with the hides on it, may be transferred bodily from one vat to another. Instead of chains C and G, ropes or any other known equivalents may be substituted.

What I claim as new, and desire to secure by Letters Patent, is—

1. In combination, with a tan-vat, a horizontal platform, adapted to receive the hides upon its surface, and to be raised and lowered in the vat, by means substantially as described.

2. The combination of the platform B′ and posts D D, top cross-beam E, binding-chains C C, and hoisting-chains G G, substantially as and for the purpose set forth.

In testimony that I claim the above I have hereunto subscribed my name in the presence of two witnesses.

OTIS W. BEAN.

Attest:

JOHN F. ACKER, Jr.,
C. H. MCEWEN.